(12) United States Patent
Lu et al.

(10) Patent No.: US 11,295,112 B2
(45) Date of Patent: Apr. 5, 2022

(54) FAST SYNTHETIC HARALICK TEXTURE GENERATION FOR HISTOLOGY IMAGES

(71) Applicant: Case Western Reserve University, Cleveland, OH (US)

(72) Inventors: Cheng Lu, Cleveland Heights, OH (US); Anant Madabhushi, Shaker Heights, OH (US); Khoi Le, Cleveland, OH (US)

(73) Assignee: Case Western Reserve University, Cleveland, OH (US)

( * ) Notice: Subject to any disclaimer, the term of this patent is extended or adjusted under 35 U.S.C. 154(b) by 4 days.

(21) Appl. No.: 17/029,518

(22) Filed: Sep. 23, 2020

(65) Prior Publication Data

US 2021/0089745 A1 Mar. 25, 2021

Related U.S. Application Data (60) Provisional application No. 62/904,760, filed on Sep. 24, 2019.

(51) Int. Cl.
*G06K 9/00* (2006.01)
*G06T 7/00* (2017.01)
*G06K 9/62* (2022.01)

(52) U.S. Cl.
CPC ....... *G06K 9/0014* (2013.01); *G06K 9/00147* (2013.01); *G06K 9/6232* (2013.01); *G06T 7/0012* (2013.01); *G06T 2207/20081* (2013.01); *G06T 2207/30096* (2013.01)

(58) Field of Classification Search
None
See application file for complete search history.

(56) References Cited

U.S. PATENT DOCUMENTS 10,839,510 B2 * 11/2020 Mahoor ............... G06K 9/6269

\* cited by examiner

*Primary Examiner* — Soo Jin Park
(74) *Attorney, Agent, or Firm* — Eschweiler & Potashnik, LLC (57) ABSTRACT

Embodiments discussed herein facilitate training deep learning models to generate synthetic versions of histological texture features and employing such deep learning models. One example embodiment is an apparatus configured to convert a stained histological image to grayscale; extract patches from the grayscale image; for each patch of the plurality of patches: provide that patch to a deep learning model trained to generate a synthetic version of a texture feature; and obtain an associated patch from the deep learning model that indicates an associated value of the synthetic version of the histology texture feature for each pixel of that patch; and merge the associated patches for each patch of the plurality of patches to generate an associated feature map for the stained histological image, wherein the associated feature map indicates the associated value of the synthetic version of the histology texture feature for each pixel of the plurality of pixels.

20 Claims, 8 Drawing Sheets

FAST SYNTHETIC HARALICK TEXTURE GENERATION FOR HISTOLOGY IMAGES

CROSS REFERENCE TO RELATED APPLICATIONS

This application claims the benefit of U.S. Provisional Patent Application No. 62/904,760 filed Sep. 24, 2019, entitled "FAST SYNTHETIC HARALICK TEXTURE GENERATION FOR HISTOLOGY IMAGES", the contents of which are herein incorporated by reference in their entirety.

BACKGROUND

Sophisticated histomorphometric analysis with computer-aided image analysis of digital pathology slide images has the potential to "unlock" more revealing sub-visual attributes about tumors, than might be discernible based off visual inspections of the slides alone. In particular, texture has been shown to be relevant in the context of nuclei and stroma, where they been associated with underlying biology, for example, specific chromatin texture in the cancerous nuclei which may indicate certain genetic abnormalities. Texture features extracted from Grey Level Co-occurrence Matrix (GLCM) has been shown capable of discrimination of different cell types in the context of colorectal cancer. Additionally, texture features (Haar, Haralick, and Laws) together with a classifier ensemble have been used to classify anaplastic resected tissue using histological images.

Derived from co-occurrence matrices, Haralick et al. defined 13 high order statistics that can be used for texture analysis. Parallelization of the code for generating and executing GLCM images on a Tesla K40c (12 GB, 2880 CUDA cores) takes approximately 40 minutes using a 5×5 pixels kernel on a 512×512 pixels image. Given the very large size of digital pathology images the textural interrogation of these images can lead to a computational bottleneck.

BRIEF DESCRIPTION OF THE DRAWINGS

The accompanying drawings, which are incorporated in and constitute a part of the specification, illustrate various example operations, apparatus, methods, and other example embodiments of various aspects discussed herein. It will be appreciated that the illustrated element boundaries (e.g., boxes, groups of boxes, or other shapes) in the figures represent one example of the boundaries. One of ordinary skill in the art will appreciate that, in some examples, one element can be designed as multiple elements or that multiple elements can be designed as one element. In some examples, an element shown as an internal component of another element may be implemented as an external component and vice versa. Furthermore, elements may not be drawn to scale.

DETAILED DESCRIPTION

Various embodiments discussed herein can train a deep learning model to generate a synthetic version of a histological texture feature, generate a synthetic version of a histological texture feature via a trained deep learning model, and/or generate a diagnosis and/or prognosis for a medical condition based at least in part on a synthetic version of a histological texture feature via a trained deep learning model. Synthetic versions of histological texture features generated via techniques discussed herein can provide similar diagnostic and/or prognostic information as traditional histological texture features, but can be computed substantially faster. Faster computation time can provide multiple advantages, such as providing for the ability to process more samples in the same time, or to provide diagnostic/prognostic information to clinicians (and subsequently patients) on a reduced time-scale, which can be closer to real-time.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic or circuit, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, and so on, refer to actions and processes of a computer system, logic, circuit, processor, or similar electronic device that manipulates and transforms data represented as physical (electronic) quantities.

Example methods and operations may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components.

Furthermore, additional and/or alternative methodologies can employ additional, not illustrated blocks.

Figure 1:
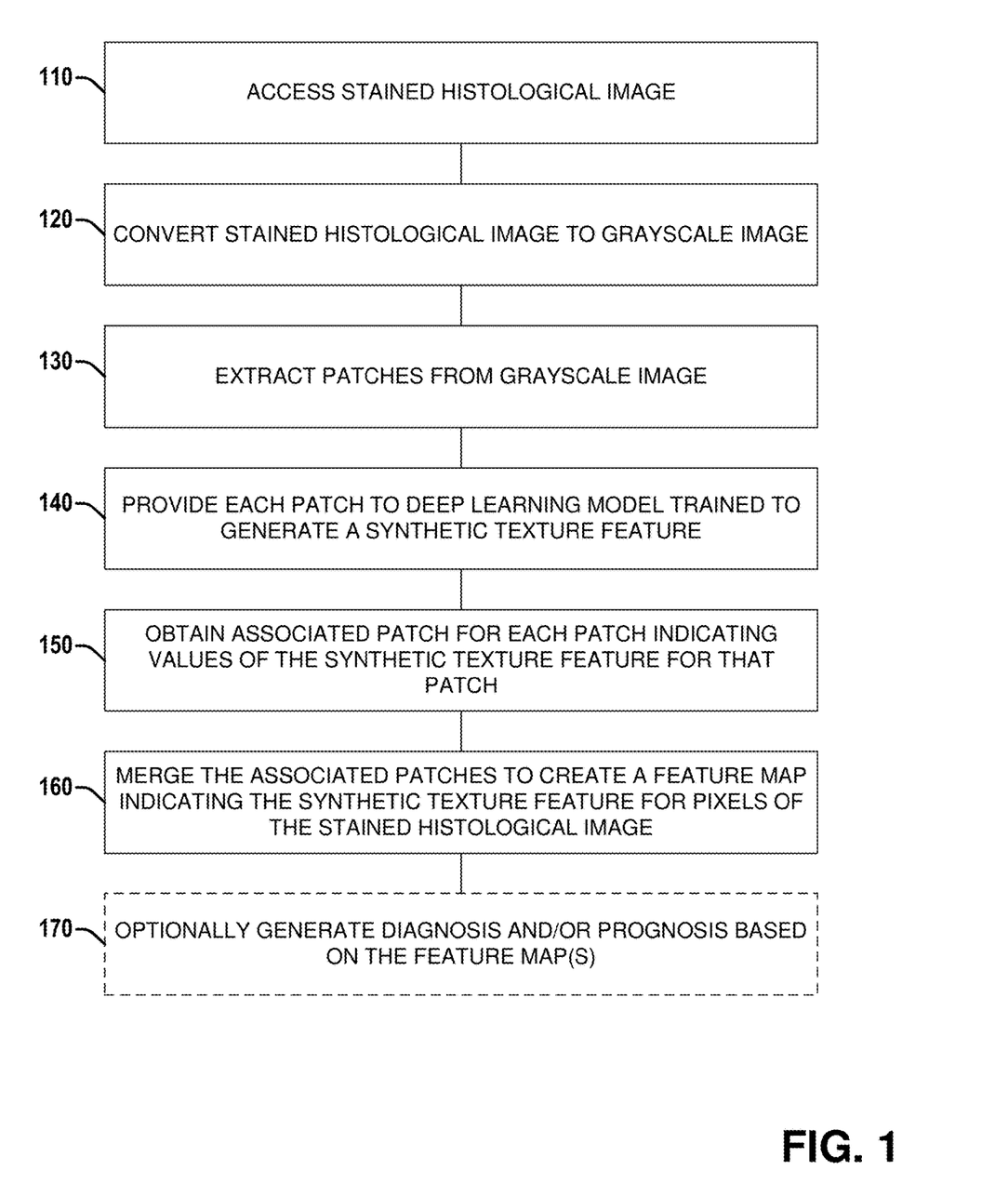
FIG. 1 illustrates a flow diagram of an example method/set of operations that can be performed by one or more processors to generate one or more synthetic texture features via trained deep learning (DL) model(s) (e.g., convolutional neural network(s) (CNN(s)), etc.) and/or determine a prognosis and/or diagnosis for a medical condition based on synthetic texture feature(s) generated via trained DL model(s), according to various embodiments discussed herein.

Referring to FIG. 1, illustrated is a flow diagram of an example method/set of operations 100 that can be performed by one or more processors to generate one or more synthetic texture features via trained deep learning (DL) model(s) (e.g., convolutional neural network(s) (CNN(s)), etc.) and/or determine a prognosis and/or diagnosis for a medical condition based on synthetic texture feature(s) generated via trained DL model(s), according to various embodiments discussed herein. Processor(s) can include any combination of general-purpose processors and dedicated processors (e.g., graphics processors, application processors, etc.). The one or more processors can be coupled with and/or can include memory or storage and can be configured to execute instructions stored in the memory or storage to enable various apparatus, applications, or operating systems to perform the operations. The memory or storage devices may include main memory, disk storage, or any suitable combination thereof. The memory or storage devices can comprise—but is not limited to—any type of volatile or non-volatile memory such as dynamic random access memory (DRAM), static random-access memory (SRAM), erasable programmable read-only memory (EPROM), electrically erasable programmable read-only memory (EEPROM), Flash memory, or solid-state storage.

The set of operations 100 can comprise, at 110, accessing a stained histology image (e.g., a digitized image of a stained histology slide or portion thereof) of a patient. In various embodiments and in the example use case discussed below, the stained histology image can be obtained via a system and/or apparatus implementing the set of operations 100, or can be obtained from a separate medical imaging system (e.g., optical microscope). Additionally, the stained histology image can be accessed contemporaneously with or at any point prior to performing the set of operations 100.

The set of operations 100 can further comprise, at 120, converting the stained histological image to a grayscale image.

The set of operations 100 can further comprise, at 130, extracting patches from the grayscale image. The extracted patches can each be of the same size (e.g., 128×128 pixels, or some other size), with centers (or other reference point/pixel) that can be separated by a stride (e.g., which can be the side length of the patch, or some lesser size), and can comprise between them all pixels of the grayscale image, or all pixels of a region of interest (ROI) of the grayscale image, etc.

The set of operations 100 can further comprise, at 140, providing each of the extracted patches to a deep learning model trained to generate a synthetic version of a histology texture feature from an input image patch. The texture feature can be, for example, one of the Haralick features, or some other texture feature (e.g., Haar, Laws, etc.).

The set of operations 100 can further comprise, at 150, obtaining an associated output patch for each input patch, wherein the associated output patch can comprise the same number of pixels as the input patch, wherein each pixel of the associated output patch can indicate a value of the synthetic version of the histology texture feature for a corresponding pixel of the input patch.

The set of operations 100 can further comprise, at 160, merging the associated output patches to create a feature map that indicates a value of the synthetic texture feature for each pixel of the stained histology image covered by the extracted patches (e.g., the entire stained histology image, a ROI, etc.).

In some embodiments, the set of operations 100 can comprise performing acts 140-160 a plurality of times, once for each of a plurality of synthetic versions of different histology texture features (e.g., for 2 or more features, each of which can be a Haralick feature, Haar feature, Laws feature, etc.).

Optionally, the set of operations 100 can further comprise, at 170, generating one or more of a diagnosis or a prognosis for a disease based on the feature map(s) generated at 160.

Figure 2:
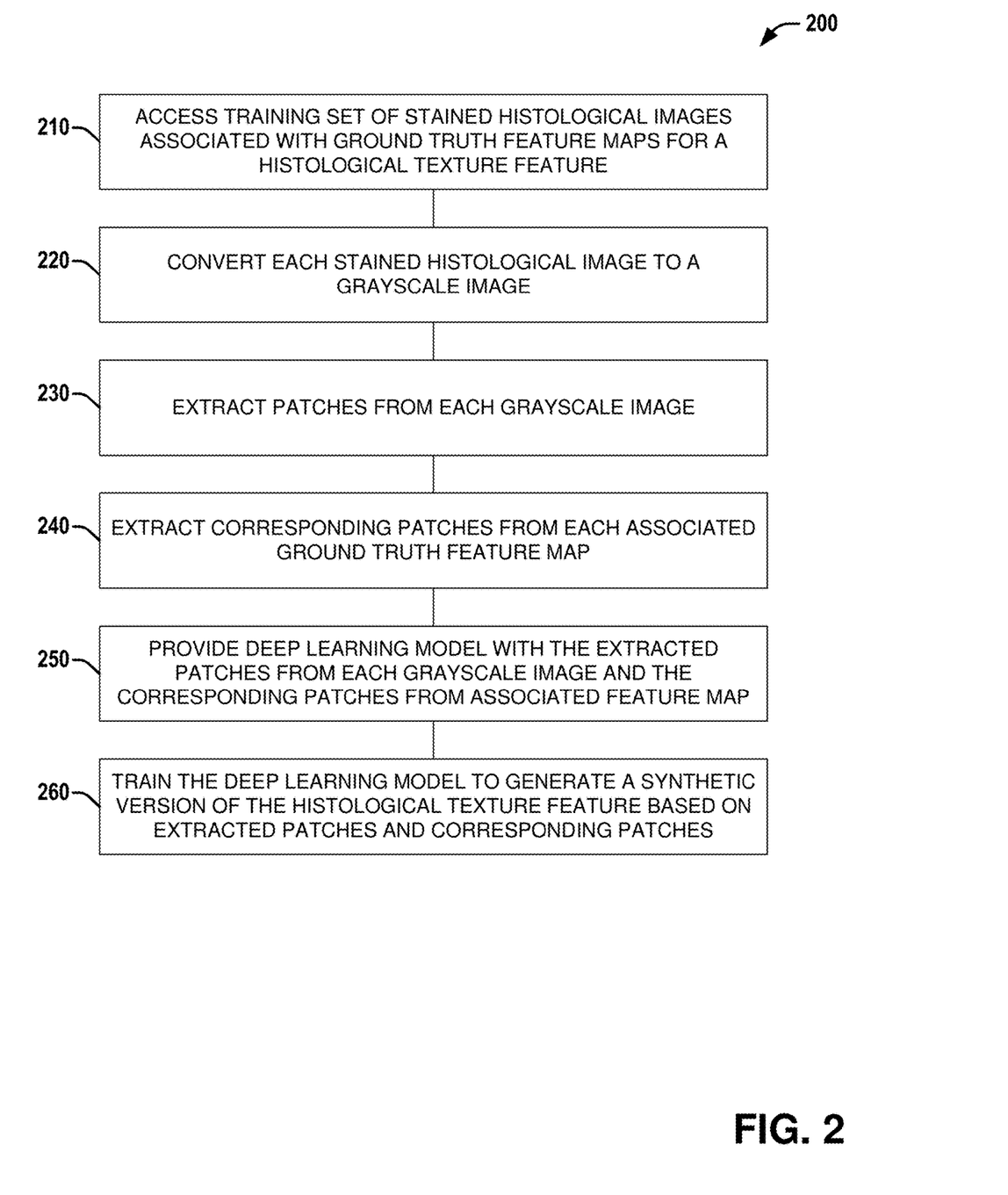
FIG. 2 illustrates a flow diagram of an example method/set of operations that can be performed by one or more processors to train a deep learning model to generate a synthetic version of a histology texture feature for an input histology image, according to various aspects discussed herein.

Referring to FIG. 2, illustrated is a flow diagram of an example method/set of operations 200 that can be performed by one or more processors to train a deep learning model to generate a synthetic version of a histology texture feature for an input histology image, according to various aspects discussed herein.

The set of operations 200 can comprise, at 210, accessing a training set of stained histology images, wherein each stained histology image of the training set can be associated with a known ground truth feature map for a histological texture feature (e.g., a Haralick feature, etc.). The feature map can be generated via existing techniques for computing the associated histological texture feature. In various embodiments and in the example use case discussed below, the training set of stained histology images can be obtained via a system and/or apparatus implementing the set of operations 200, or can be obtained from a separate medical imaging system. Additionally, the training set can be accessed contemporaneously with or at any point prior to performing the set of operations 200.

The set of operations 200 can further comprise, at 220, converting each stained histological image to a corresponding grayscale image.

The set of operations 200 can further comprise, at 230, extracting patches (e.g. randomly) from the corresponding grayscale image for each stained histological image of the training set. In various aspects, patches from regions with little or no tissue can be deliberately under-sampled.

The set of operations 200 can further comprise, at 240, for each patch extracted at 230, extracting a corresponding patch from the associated ground truth feature map (e.g., a patch with the same size and location in the associated ground truth feature map, comprising ground truth values of the texture feature for the pixels of that extracted patch).

The set of operations 200 can further comprise, at 250, providing a deep learning model with the patches extracted at 230 and 240.

The set of operations 200 can further comprise, at 260, training the deep learning model to generate a synthetic version of the histological texture feature based on the patches provided at 250.

Additional aspects and embodiments are discussed below in connection with the following example use case.

Example Use Case: Synthetic Histological Texture Features (SynPathex) Generation Using Convolutional Neural Network The following discussion provides example embodiments in connection with an example use case involving training, validation, and testing of deep learning models to generate synthetic versions of Haralick texture features.

The advent of digital slide scanners has spurred great interest in the usage of computational approaches for the analysis of digital pathology slides. In particular, the texture of various histologic components, such as nuclei and stroma, have been associated with valuable diagnostic and prognostic information. For instance, textural patterns associated with chromatin arrangement in nuclei have been found to be strongly prognostic of recurrence in early stage breast and lung cancer. Unfortunately, since a digital pathology slide may contain in excess of 100 million pixels at 40× magnification, the computation of texture features quickly becomes intractable. The example use case presents a Synthetic Histological Texture Features (SynPathex) Generation framework, which employs a U-net to rapidly approximate traditional computationally expensive Haralick texture features. During training, SynPathex learns a mapping relationship between pixels in routine H&E stained image and their corresponding "true" texture values. Given a new unseen image, SynPathex can employ this mapping to rapidly approximate the corresponding texture representation. For each of 13 Haralick Features, a SynPathex model was trained with random patches from 303 H&E stained pathology images. On 30 test images, the surrogate Haralick texture features yielded an average normalized mean-square-difference rate of 2.02±1.4% and absolute difference rate of 1.1±0.83% compared with the ground truth, suggesting that SynPathex is able to accurately approximate Haralick feature values. When comparing the SynPathex and the traditional Haralick feature generation approaches on the CPU platform for a 512×512 pixels H&E stained image, the SynPathex was found to be 50 to 100 times faster than traditional Haralick calculation (the GPU version of SynPathex will be even faster). The example use case also tested the SynPathex feature for differentiation of TP53+ vs. wildtype patients using H&E-stained non-small cell lung histological images (with AUC=0.63, which is the same performance yielded by the traditional Haralick feature). SynPathex is able to facilitate its downstream utility in histology analysis pipelines in a fast and efficient manner.

1. Overview

Sophisticated histomorphometric analysis with computer-aided image analysis of digital pathology slide images has the potential to "unlock" more revealing sub-visual attributes about tumors than might be discernible based off visual inspections of the slides alone. In particular, texture has been shown to be relevant in the context of nuclei and stroma, where it has been associated with underlying biology, for example, specific chromatin texture in the cancerous nuclei which may indicate certain genetic abnormalities. One group showed that the texture features extracted from Grey Level Co-occurrence Matrix (GLCM) are capable of discrimination of different cell types in the context of colorectal cancer. Another group was able to use texture features (Haar, Haralick, and Laws) together with a classifier ensemble to classify anaplastic resected tissue using histological images.

Derived from co-occurrence matrices, Haralick et al defined 13 high order statistics that can be used for texture analysis. Parallelization of the code for generating and executing GLCM images on a Tesla K40c (12 GB, 2880 CUDA cores) takes approximately 40 minutes using a 5×5 pixels kernel on a 512×512 pixels image. Given the very large size of digital pathology images, the textural interrogation of these images can lead to a computational bottleneck. Fast calculation of Haralick texture features has been attempted by other researchers. One group reduced runtime by using recursive blocking algorithm and optimizing the code so that it will not access data unnecessarily. Some of these approaches have employed convolutional neural network (CNN) strategies. This is typically done by speeding up the texture calculation process to learn a non-linear mapping function between the input data and desired output. Another group developed a 4 convolutional layer CNN model which generated the GLCM entropy map for radiology images. However, since it is a pixel wise regression model, the sliding window method is computationally expensive. The example use case presents a deep neural network (U-net) that was able to synthesize the traditional 13. Haralick features efficiently, so that the texture feature of the whole slide histology image could be extracted in a fast manner, which will greatly facilitate the downstream histology image analysis.

The motivations and rationales for the example use case included the following: (1) Since texture feature is one kind of transparency feature that has been successfully validated on numerous applications, which may require extensive compositional time to employ, a fast computation of the texture feature would greatly benefit the existing method; (2) The current popular deep learning method may suffer from over-fitting on cohort with a small number of samples; (3) The texture features themselves are individual features, allowing for a more precise study of the better-performing ones, while DL features may be highly "entangled", making it difficult to pull out individual kernels of value; (4) The computation of Haralick features from raw pixels are non-linear, and it is non-trivial to train a regression model using neural network with a reasonable sized dataset in a reasonable amount of training time; and (5) SynPathex features have small differences compared to the original Haralick features, and have been tested for differentiation of TP53+ vs. wildtype patients using H&E-stained histopathology images.

Figure 3:
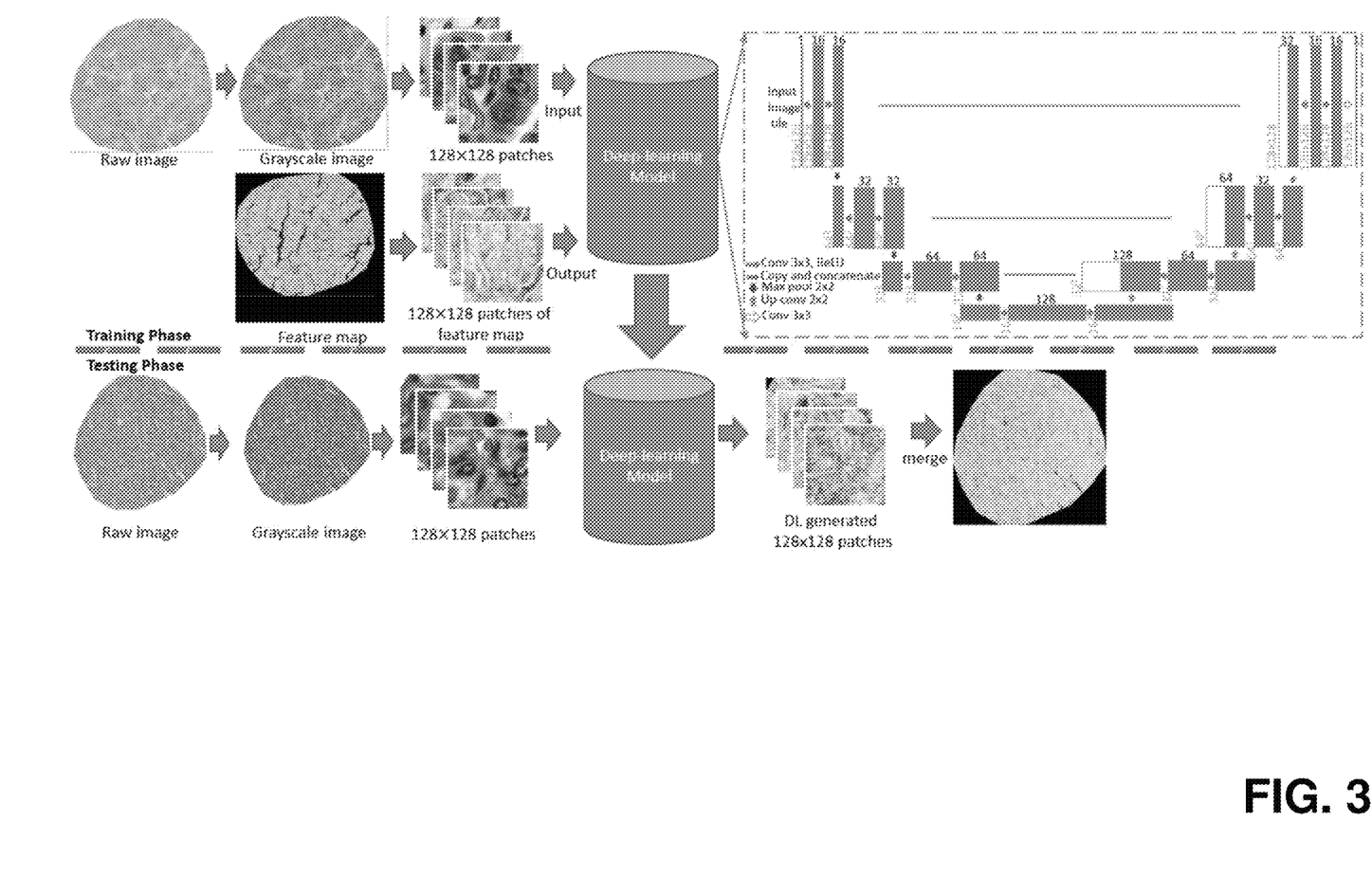
FIG. 3 illustrates a diagram showing the overall flow of the Synthetic Histological Texture Features (SynPathex) generation techniques employed in the example use case, in connection with various aspects discussed herein.

Referring to FIG. 3, illustrated is a diagram 300 showing the overall flow of the Synthetic Histological Texture Features (SynPathex) generation techniques employed in the example use case, in connection with various aspects discussed herein. In training, the model was trained using gray-scaled 128×128 patches cropped from the original H&E stained image and corresponding texture feature maps as inputs. A 21-layer U-net model was trained 100 epochs, and the one that minimized the loss function was used as a locked down model. In testing, the original H&E stained images were cropped into patches and fed into the pretrained model. The synthetic images were then generated. The example use case trained 13 different models for all 13 Haralick features.

2. Method

Dataset: From n=101 non-small cell lung squamous cell carcinoma (NSCLC) patients, 303 H&E regions of interest (ROI) were extracted at 40× magnification (0.25 mm/pixel resolution). These ROIs were selected by a pathologist (PV) based on the criteria that these ROIs contain epithelium and have good contrast. Images were then converted to grayscale, and 13 Haralick features: Sum Average, Sum of Square: Variance, Sum Entropy, Inverse Difference Moment, Sum Variance, Correlation, Angular Second Moment, Entropy, Information Measure of Correlation 1 and 2, Contrast, Difference Entropy, and Difference Variance were computed for all images using a reference implementation. This cohort was then divided into 80% (n=243) for training, 10% (n=30) for validating, and 10% (n=30) for testing (ROIs from a patient are in the same set).

Data Processing: Patches of size 128×128 pixels were randomly extracted from both the grayscale input images and their associated ground truth texture images. To avoid regions with limited tissue, those containing mostly background were artificially hypo-sampled. This process resulted in 1,600,000 patches for training $S_{train}$, and 160,000 patches for validation $S_{val}$, and 160,000 patches for testing sets $S_{test}$.

Model Training: For each of the 13 Haralick texture, a simplified U-Net architecture was trained. The U-Net model comprised (16, 32, 64, 128) channels per layer, as shown in FIG. 3. A smaller model size enables the output generation to be more efficient, and did not appear to hinder performance in the example use case. The input and output size for the network was set to 128×128 pixels, and a mini-batch size of 32 was employed. During training, the U-Net was trained to learn the mapping relationship between pixels in routine H&E stained images with their corresponding ground truth Haralick texture values computed using a traditional approach for calculating the Haralick features. The U-Net was not only able to learn the nonlinear mapping between the pixels and their corresponding ground truth Haralick texture values, but also able to learn such mapping in an image-wise manner, which is more efficiency compared to the pixel-wise computation that requires sliding window approach. After 100 epochs of training, the optimal model was selected as the one that minimized the normalized root-mean-square error (nRMSE) on the validation set $S_{val}$.

Output Generation: During testing, a sliding window of size 128×128 pixels with a stride of 128 pixels was used to feed patches from the input image to the model. Subsequently, the output image patches of size 128×128 pixels were stitched back together. The Angular Second Moment feature benefited from rescaling to a range of [0,1] due to its limited input range of [0, ⅓]. All other features were not rescaled.

3. Results

Figure 4:
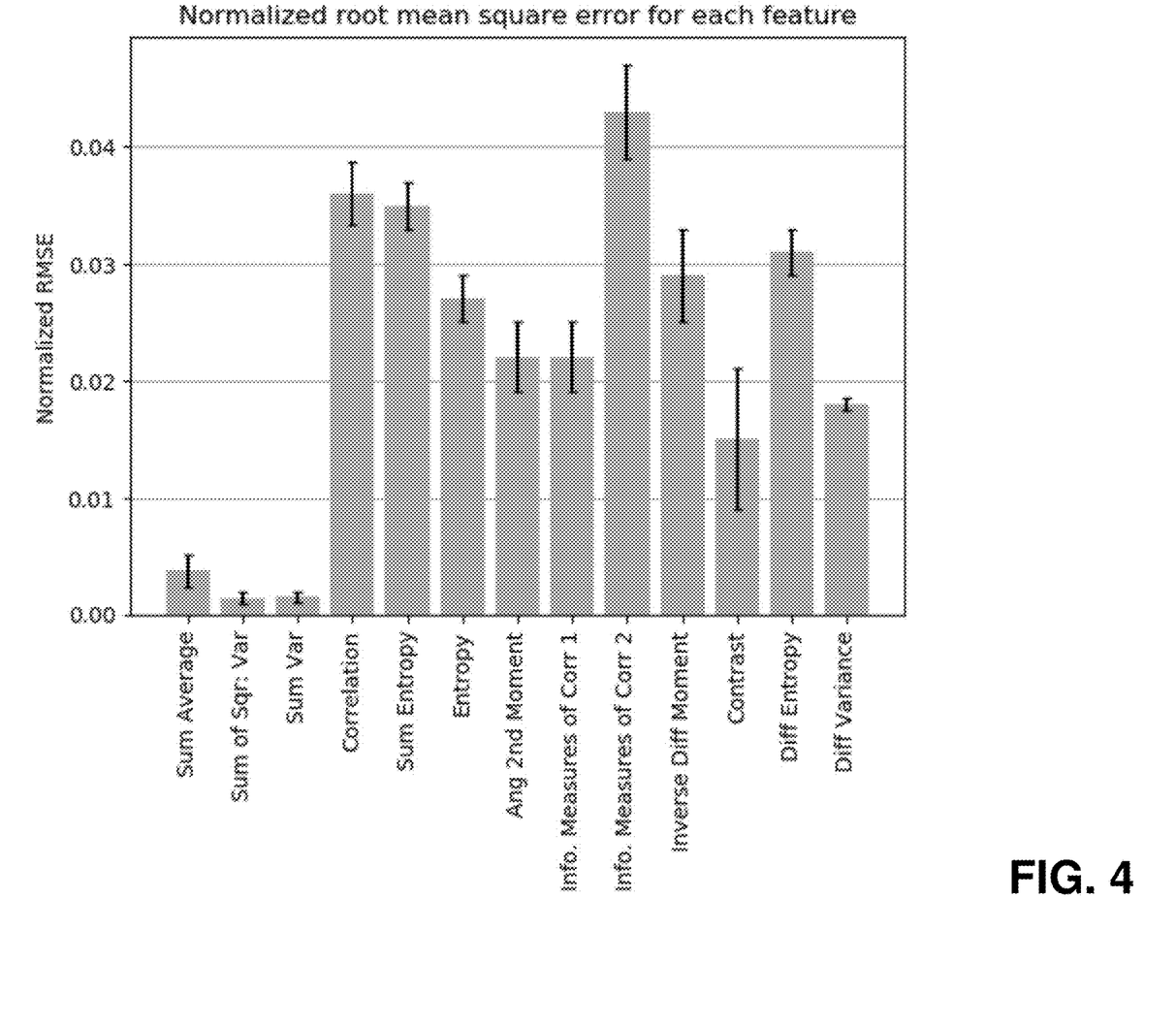
FIG. 4 illustrates a chart showing normalized root mean square error (nRMSE) for each of the synthesized Haralick features of the example use case, in connection with various aspects discussed herein.
Figure 5:
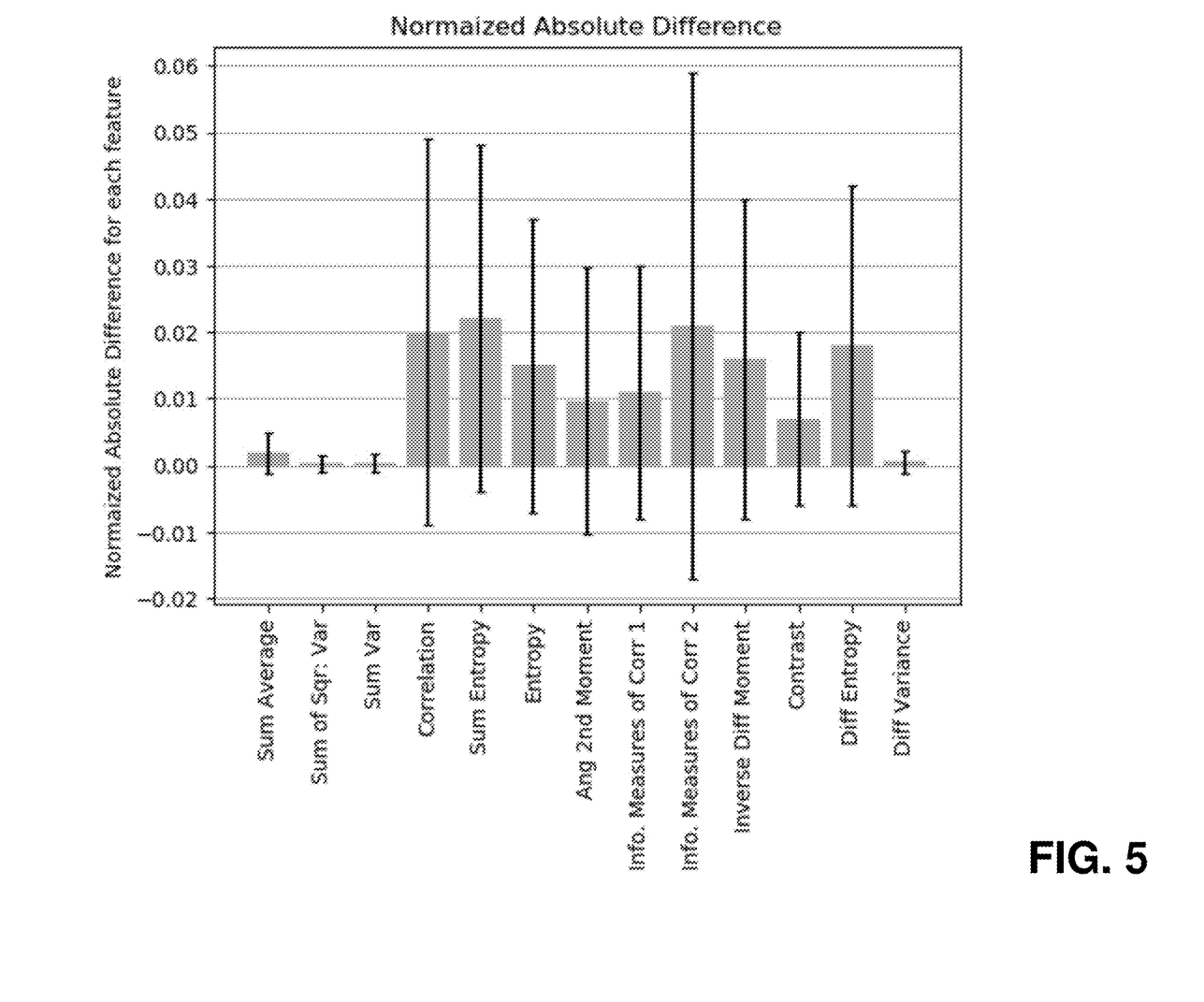
FIG. 5 illustrates a chart showing normalized absolute difference for each of the synthesized Haralick features of the example use case, in connection with various aspects discussed herein.

Quantitative Results: For each of the 13 texture models, the normalized root-mean-square error, absolute difference, and standard deviation were computed between the ground truth and synthetic image for the 30 test images in $S_{test}$. Referring to FIG. 4, illustrated is a chart showing normalized root mean square error (nRMSE) for each of the synthesized Haralick features of the example use case, in connection with various aspects discussed herein. Referring to FIG. 5, illustrated is a chart showing normalized absolute difference for each of the synthesized Haralick features of the example use case, in connection with various aspects discussed herein. An overview flowchart of the process of the example use case is shown in FIG. 3.

Figure 6:
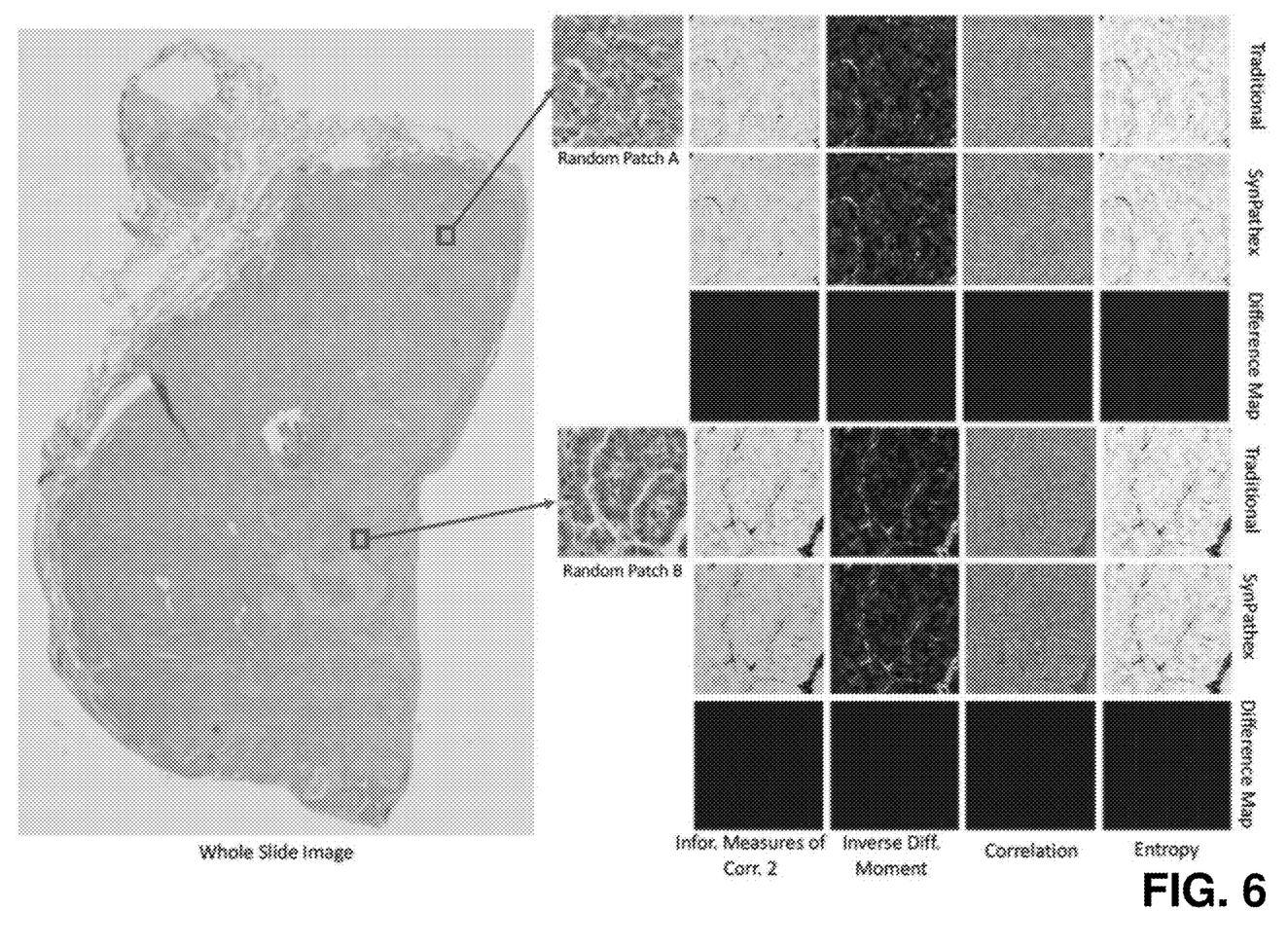
FIG. 6 illustrates an example diagram showing a visual comparison between 4 representative traditional and the corresponding synthetically generated Haralick texture features on a 512×512 pixels patch for the example use case, in connection with various aspects discussed herein.

Qualitative Results: A 512×512 pixels image patch with sufficient tissue was cropped from a random image in the $S_{test}$ and used to generate visually interpretable images of the synthetic texture features. The difference between the synthetically derived representations from the original ground-truth image were also evaluated. Both qualitatively and quantitatively, the synthetically generated results appear to be in good concordance with the actual ground truth representation features. However, there are some synthetic features which have high error rates, i.e., error rate >2%, compared to the others. A possible reason is the relatively small dynamic range of these features, for example, Information Measures of Correlation 2 has a range of [0,1], which makes it more difficult for the deep learning model to accurately predict the correct texture values. Referring to FIG. 6, illustrated is an example diagram showing a visual comparison between 4 representative traditional and the corresponding synthetically generated Haralick texture features on a 512×512 pixels patch for the example use case, in connection with various aspects discussed herein. In FIG. 6, the whole slide image is shown on the left, and two panels of randomly cropped patches are shown on the right. On each panel, the first row shows texture features generated from the traditional method, the second row shows the features generated using SynPathex, and the third row shows the heatmaps of absolute difference matrices of row 1 and row 2. As can be seen in FIG. 6, in row 1 and 2 for both random patches, visually there is no discernible difference between the ground-truth and the synthetic features.

Figure 7:
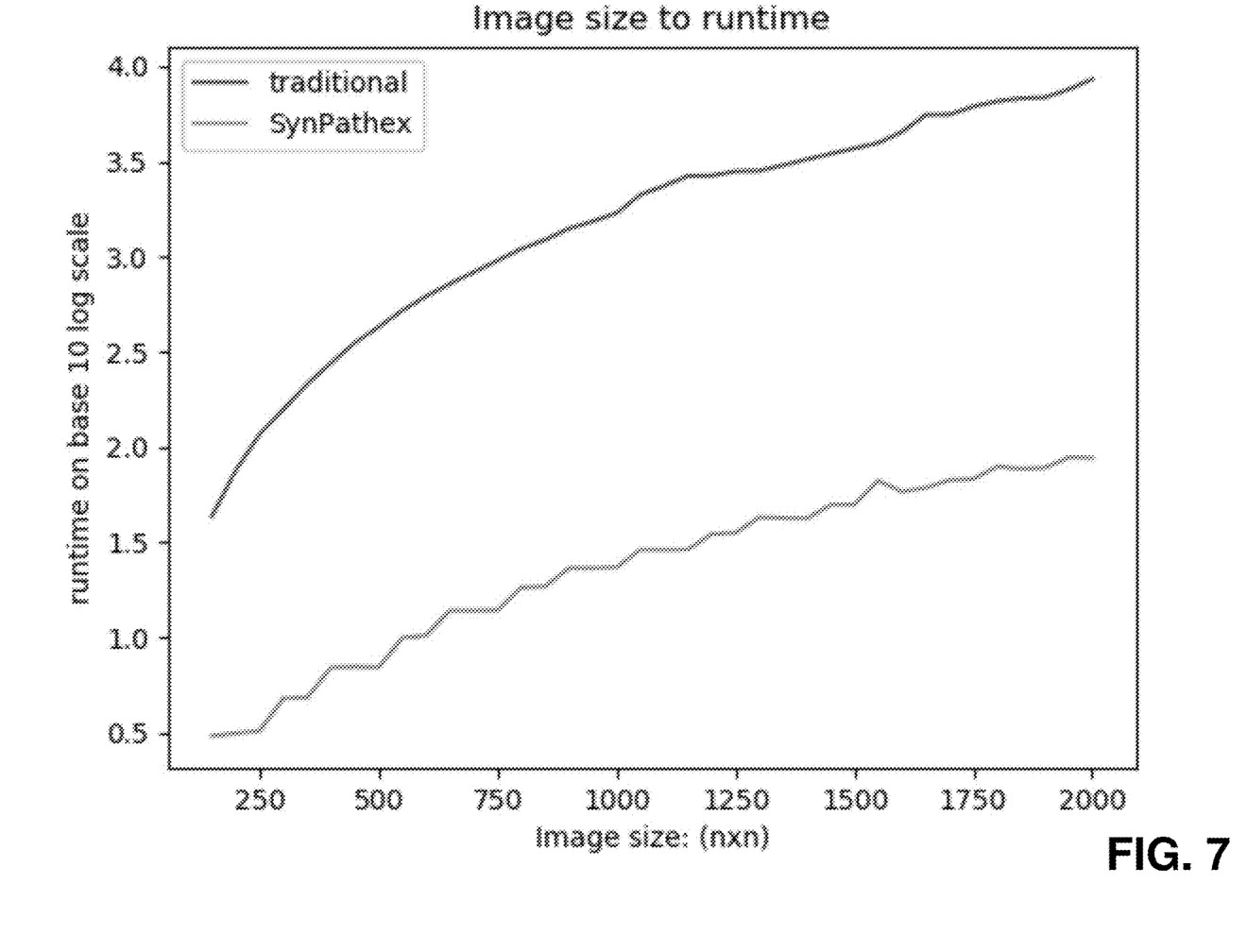
FIG. 7 illustrates a chart showing a comparison between the runtimes as a function of number of pixels for the traditional method and the SynPathex method of the example use case on a log 10 scale, in connection with various aspects discussed herein.

Runtime Analysis: The traditional way of generating Haralick texture features for a 512×512 pixels H&E stained histology image took about 400 seconds on an Intel Core i7-6700HQ CPU @ 2.6 Ghz (8 CPUs, 8 GB). For the same 512×512 pixels image, SynPathex generated Haralick texture features on the same machine using CPU took only about 6 seconds. Utilizing the parallel computing capability of GPUs, the generating time is anticipated to be much faster on a GPU. On a Tesla P100 GPU (12 GB), it took about 1 second to run for an 512×512 pixels H&E stained histology image. Referring to FIG. 7, illustrated is a chart showing a comparison between the runtimes as a function of number of pixels for the traditional method and the SynPathex method of the example use case on a $\log_{10}$ scale, in connection with various aspects discussed herein. For FIG. 7, in both cases, the runtime was calculated on an Intel Core i7-6700HQ CPU @ 2.6 Ghz (8 CPUs, 8 GB).

4. Application of Synpathex in Mutational Status Classification

In this application, it was shown that computational textures are correlated with three molecular genetic alterations that are frequently found in non-small cell lung carcinomas (NSCLC). H&E-stained histologic guide slides for samples submitted for targeted next-generation DNA sequencing on the MiSeq platform (Illumina, San Diego, Calif., USA) were scanned using Intellisite Digital Pathology Solution (Philips, Amsterdam, Netherlands).

Cases that were EGFR+/KRAS−/TP53− (EGFR+), EGFR−/KRAS+/TP53− (KRAS+), EGFR−/KRAS−/TP53+ (TP53+), and EGFR−/KRAS−/TP53−(wildtype, WT) were used for three classifications, i.e., TP53+ vs WT, TP53+ vs KRAS+, and TP53+ vs EGFR. All the images were scanned at 20× magnification (0.48 μm/pixel). Three tumor areas were annotated by a pathologist for each patient and tumor nuclei were segmented using a watershed approach. Texture features were then extracted from the segmented nuclei regions using the SynPathex, traditional Haralick feature, and Auto-Encoder feature extraction method. 100 iterations of four-fold cross validation were performed using linear discriminant analysis as a classifier that used the top three features as determined through Wilcoxon rank sum test. The mean area under the receiver operating characteristic curve (AUC) was reported as the classification performance and shown in Table 1, below. In table 1, as one may expect, the texture features generated by SynPathex yielded the same classification performance compared to that of the traditional Haralick texture features.

TABLE 1

Comparison of AUC for three classification of mutational status in NSCLC

| | Classification | | |
|---|---|---|---|
| Method | TP53+ vs WT (n = 54 vs 41) | TP53+ vs KRAS+ (n = 54 vs 72) | TP53+ vs EGFR+ (n = 54 vs 47) |
| Traditional Haralick Features | 0.63 | 0.59 | 0.59 |
| Syn Pathex | 0.63 | 0.59 | 0.59 |

5. Conclusion

The example use case presented a Synthetic Pathological Texture Features (SynPathex) generation framework to synthesize traditional Haralick texture features derived from the co-occurrence matrix for pathological image analysis. The example use case showed that the SynPathex is able to leverage the non-linear mapping ability of CNN to significantly improve the computational efficiency of the texture feature extraction process and was also able to be used in mutational status classification in non-small cell lung carcinomas.

Additional Embodiments

In various example embodiments, method(s) discussed herein can be implemented as computer executable instructions. Thus, in various embodiments, a computer-readable storage device can store computer executable instructions that, when executed by a machine (e.g., computer, processor), cause the machine to perform methods or operations described or claimed herein including operation(s) described in connection with methods 100, 200, 300, or any other methods or operations described herein. While executable instructions associated with the listed methods are described as being stored on a computer-readable storage device, it is to be appreciated that executable instructions associated with other example methods or operations described or claimed herein can also be stored on a computer-readable storage device. In different embodiments, the example methods or operations described herein can be triggered in different ways. In one embodiment, a method or operation can be triggered manually by a user. In another example, a method or operation can be triggered automatically.

Embodiments discussed herein relate to training and/or employing models or classifiers to generate synthetic version(s) of histological texture feature(s) (e.g., Haralick features) and or a diagnosis and/or prognosis from those synthetic version(s) of histological texture feature(s), based at least in part on features of histological images that are not perceivable by the human eye, and involve computation that cannot be practically performed in the human mind. As one example, deep learning classifiers as described herein cannot be implemented in the human mind or with pencil and paper. Embodiments thus perform actions, steps, processes, or other actions that are not practically performed in the human mind, at least because they require a processor or circuitry to access digitized images stored in a computer memory and to extract or compute features that are based on the digitized images and not on properties of tissue or the images that are perceivable by the human eye. Embodiments described herein can use a combined order of specific rules, elements, operations, or components that render information into a specific format that can then be used and applied to create desired results more accurately, more consistently, and with greater reliability than existing approaches, thereby producing the technical effect of improving the performance of the machine, computer, or system with which embodiments are implemented.

Figure 8:
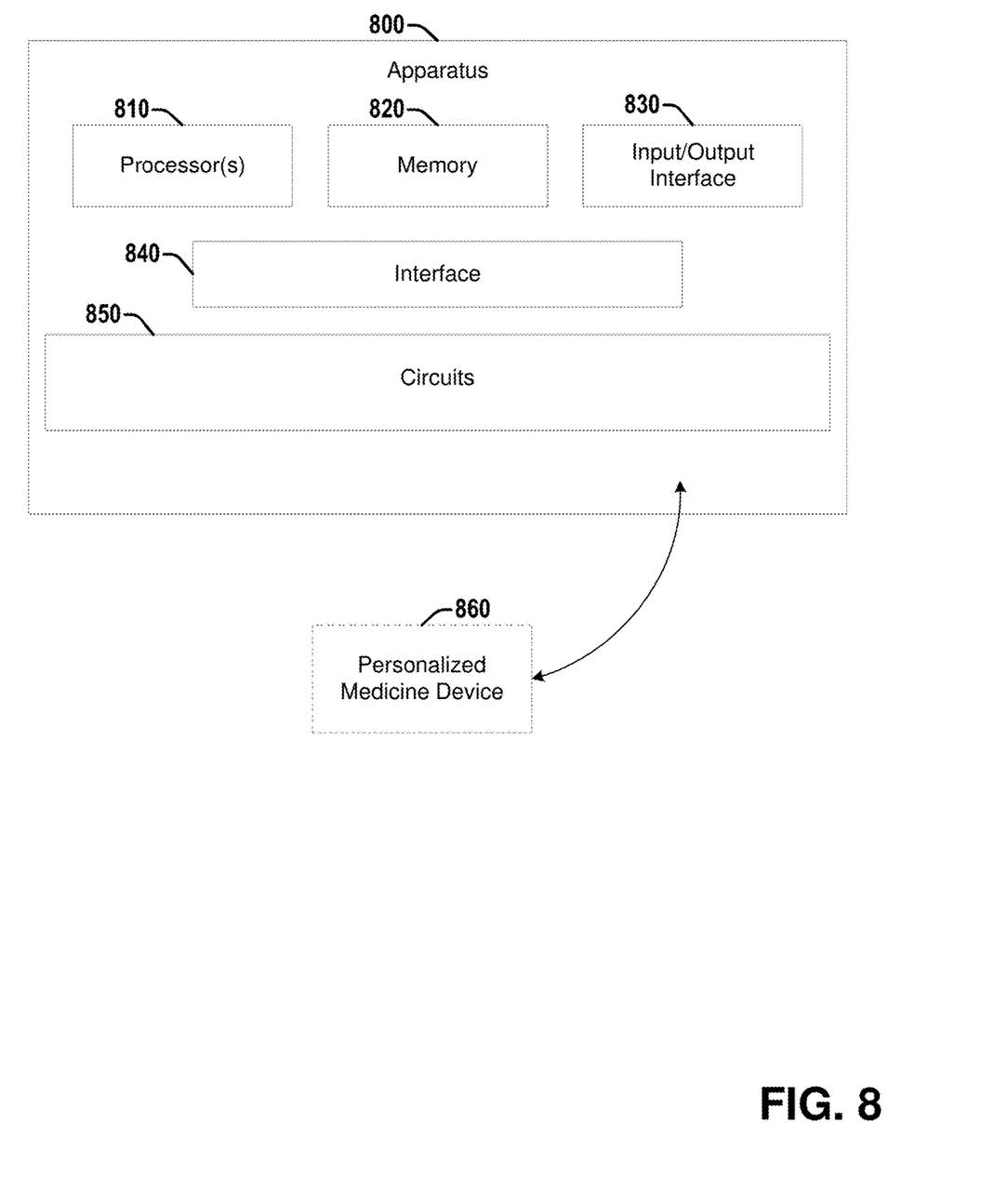
FIG. 8 illustrates a diagram of an example apparatus that can facilitate generating one or more synthetic texture features via trained deep learning (DL) model(s) (e.g., convolutional neural network(s) (CNN(s)), etc.), determining a prognosis and/or diagnosis for a medical condition based on synthetic texture feature(s) generated via trained DL model(s), and/or training a DL model(s) to perform such generation/determination, according to various embodiments discussed herein.

Referring to FIG. 8, illustrated is a diagram of an example apparatus 800 that can facilitate generating one or more synthetic texture features via trained deep learning (DL) model(s) (e.g., convolutional neural network(s) (CNN(s)), etc.), determining a prognosis and/or diagnosis for a medical condition based on synthetic texture feature(s) generated via trained DL model(s), and/or training a DL model(s) to perform such generation/determination, according to various embodiments discussed herein. Apparatus 800 can be configured to perform various techniques discussed herein, for example, various operations discussed in connection with sets of operations 100, 200, and/or 300. Apparatus 800 can comprise one or more processors 810 and memory 820. Processor(s) 810 can, in various embodiments, comprise circuitry such as, but not limited to, one or more single-core or multi-core processors. Processor(s) 810 can include any combination of general-purpose processors and dedicated processors (e.g., graphics processors, application processors, etc.). The processor(s) can be coupled with and/or can comprise memory (e.g., of memory 820) or storage and can be configured to execute instructions stored in the memory 820 or storage to enable various apparatus, applications, or operating systems to perform operations and/or methods discussed herein. Memory 820 can be configured to store one or more stained histological images (e.g., digitized image of a stained histology slide, etc.). Each of the image(s) can comprise a plurality of pixels, each pixel having an associated intensity. Memory 820 can be further configured to store additional data involved in performing operations discussed herein, such as information employed in various methods (e.g., 100, 200, 300) discussed in greater detail herein.

Apparatus 800 can also comprise an input/output (I/O) interface 830 (e.g., associated with one or more I/O devices), a set of circuits 850, and an interface 840 that connects the processor(s) 810, the memory 820, the I/O interface 830, and the set of circuits 850. I/O interface 830 can be configured to transfer data between memory 820, processor 810, circuits 850, and external devices, for example, a medical imaging device (e.g., optical microscope, etc.), and/or one or more remote devices for receiving inputs and/or providing outputs to a clinician, patient, etc., such as optional personalized medicine device 860.

The processor(s) 810 and/or one or more circuits of the set of circuits 850 can perform one or more acts associated with a method or set of operations discussed herein, such as set of operations 100, 200, and/or 300. In various embodiments, different acts (e.g., different operations of a set of operations) can be performed by the same or different processor(s) 810 and/or one or more circuits of the set of circuits 850.

Apparatus 800 can optionally further comprise personalized medicine device 860. Apparatus 800 can be configured to provide a diagnosis or prognosis for a patient determined based at least in part on synthetic texture features discussed herein, and/or other data to personalized medicine device 860. Personalized medicine device 860 may be, for example, a computer assisted diagnosis (CADx) system or other type of personalized medicine device that can be used to facilitate monitoring and/or treatment of an associated medical condition. In some embodiments, processor(s) 810 and/or one or more circuits of the set of circuits 850 can be further configured to control personalized medicine device 860 to display the diagnosis and/or prognosis for a clinician or the patient or other data on a computer monitor, a smartphone display, a tablet display, or other displays.

Examples herein can include subject matter such as an apparatus, an optical microscope, a personalized medicine system, a CADx system, a processor, a system, circuitry, a method, means for performing acts, steps, or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for generating system-independent quantitative perfusion measurements, according to embodiments and examples described.

Example 1 is a non-transitory computer-readable medium storing computer-executable instructions that, when executed, cause a processor to perform operations, comprising: accessing a stained histological image comprising a plurality of pixels; converting the stained histological image to an associated grayscale image; extracting a plurality of patches from the associated grayscale image, wherein each pixel of the plurality of pixels of the stained histological image is within at least one patch of the plurality of patches; for each patch of the plurality of patches: providing that patch to a deep learning model that has been trained to generate a synthetic version of a histology texture feature; and obtaining an associated patch from the deep learning model, wherein the associated patch indicates an associated value of the synthetic version of the histology texture feature for each pixel of that patch; and merging the associated patches for each patch of the plurality of patches to generate an associated feature map for the stained histological image, wherein the associated feature map indicates the associated value of the synthetic version of the histology texture feature for each pixel of the plurality of pixels.

Example 2 comprises the subject matter of any variation of any of example(s) 1, wherein the deep learning model is a convolutional neural network (CNN).

Example 3 comprises the subject matter of any variation of any of example(s) 2, wherein the deep learning model has a U-net architecture.

Example 4 comprises the subject matter of any variation of any of example(s) 1-3, wherein the histology texture feature is a Haralick feature.

Example 5 comprises the subject matter of any variation of any of example(s) 4, wherein the Haralick features is one of a sum average, a sum of square: variance, a sum entropy, an inverse difference moment, a sum variance, a correlation, an angular second moment, an entropy, an information measure of correlation 1, an information measure of correlation 2, a contrast, a difference entropy, or a difference variance.

Example 6 comprises the subject matter of any variation of any of example(s) 1-5, wherein the operations further comprise generating one of a diagnosis or a prognosis for the stained histological image based at least in part on the associated feature map.

Example 7 comprises the subject matter of any variation of any of example(s) 6, wherein the stained histological image comprises a portion of a tumor, and wherein generating one of the diagnosis or the prognosis comprises determining a mutational status classification of the tumor.

Example 8 comprises the subject matter of any variation of any of example(s) 1-7, wherein each patch of the plurality of patches is 128×128 pixels, and wherein, for each patch of the plurality of patches, the associated patch is 128×128 pixels.

Example 9 comprises the subject matter of any variation of any of example(s) 1-8, wherein the operations further comprise: for each patch of the plurality of patches: providing that patch to an additional deep learning model that has been trained to generate a synthetic version of an additional histology texture feature; and obtaining an additional associated patch from the additional deep learning model, wherein the additional associated patch indicates an associated value of the synthetic version of the additional histology texture feature for each pixel of that patch; and merging the additional associated patches for each patch of the plurality of patches to generate an additional associated feature map for the stained histological image, wherein the associated feature map indicates the associated value of the synthetic version of the additional histology texture feature for each pixel of the plurality of pixels, wherein the additional histology texture feature is different from the histology texture feature.

Example 10 comprises the subject matter of any variation of any of example(s) 1-9, wherein the histology texture feature is one of a Haar feature or a Laws feature.

Example 11 is a non-transitory computer-readable medium storing computer-executable instructions that, when executed, cause a processor to perform operations, comprising: accessing a training set comprising a plurality of stained histological images, wherein each stained histological image is associated with an associated feature map that indicates associated ground truth values of a histology texture feature for pixels of that stained histological image; for each stained histological image of the training set: converting that stained histological image to an associated grayscale image; extracting a first plurality of patches from the associated grayscale image; for each patch of the first plurality of patches, extracting a corresponding patch from the associated feature map for that stained histological image; and providing the first plurality of patches and the corresponding patches to a deep learning model; and based on the first plurality of patches and the corresponding patches for each stained histological image of the training set, training the deep learning model to generate a synthetic version of the histology texture feature from an additional grayscale stained histological image.

Example 12 comprises the subject matter of any variation of any of example(s) 11, wherein the deep learning model is a convolutional neural network (CNN).

Example 13 comprises the subject matter of any variation of any of example(s) 12, wherein the deep learning model has a U-net architecture.

Example 14 comprises the subject matter of any variation of any of example(s) 11-13, wherein the histology texture feature is a Haralick feature.

Example 15 comprises the subject matter of any variation of any of example(s) 14, wherein the Haralick features is one of a sum average, a sum of square: variance, a sum entropy, an inverse difference moment, a sum variance, a correlation, an angular second moment, an entropy, an information measure of correlation 1, an information measure of correlation 2, a contrast, a difference entropy, or a difference variance.

Example 16 comprises the subject matter of any variation of any of example(s) 11-15, wherein, for each stained histological image of the training set, each patch of the first plurality of patches is 128×128 pixels, and wherein, for each patch of the first plurality of patches, the corresponding patch is 128×128 pixels.

Example 17 is an apparatus, comprising: memory configured to store a stained histological image comprising a plurality of pixels; and one or more processors configured to: convert the stained histological image to an associated grayscale image; extract a plurality of patches from the associated grayscale image, wherein each pixel of the plurality of pixels of the stained histological image is within at least one patch of the plurality of patches; for each patch of the plurality of patches: provide that patch to a deep learning model that has been trained to generate a synthetic version of a histology texture feature; and obtain an associated patch from the deep learning model, wherein the associated patch indicates an associated value of the synthetic version of the histology texture feature for each pixel of that patch; and merge the associated patches for each patch of the plurality of patches to generate an associated feature map for the stained histological image, wherein the associated feature map indicates the associated value of the synthetic version of the histology texture feature for each pixel of the plurality of pixels.

Example 18 comprises the subject matter of any variation of any of example(s) 17, wherein the deep learning model has a U-net architecture.

Example 19 comprises the subject matter of any variation of any of example(s) 17-18, wherein the histology texture feature is a Haralick feature.

Example 20 comprises the subject matter of any variation of any of example(s) 17-19, wherein the one or more processors are further configured to generate one of a diagnosis or a prognosis for the stained histological image based at least in part on the associated feature map.

Example 21 comprises an apparatus comprising means for executing any of the described operations of examples 1-20.

Example 22 comprises a machine readable medium that stores instructions for execution by a processor to perform any of the described operations of examples 1-20.

Example 23 comprises an apparatus comprising: a memory; and one or more processors configured to: perform any of the described operations of examples 1-20.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage device", as used herein, refers to a device that stores instructions or data. "Computer-readable storage device" does not refer to propagated signals. A computer-readable storage device may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage device may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

"Circuit", as used herein, includes but is not limited to hardware, firmware, software in execution on a machine, or combinations of each to perform a function(s) or an action(s), or to cause a function or action from another logic, method, or system. A circuit may include a software controlled microprocessor, a discrete logic (e.g., ASIC), an analog circuit, a digital circuit, a programmed logic device, a memory device containing instructions, and other physical devices. A circuit may include one or more gates, combinations of gates, or other circuit components. Where multiple logical circuits are described, it may be possible to incorporate the multiple logical circuits into one physical circuit. Similarly, where a single logical circuit is described, it may be possible to distribute that single logical circuit between multiple physical circuits.

To the extent that the term "includes" or "including" is employed in the detailed description or the claims, it is intended to be inclusive in a manner similar to the term "comprising" as that term is interpreted when employed as a transitional word in a claim.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2*d*. Ed. 1995).

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A non-transitory computer-readable medium storing computer-executable instructions that, when executed, cause a processor to perform operations, comprising:
   accessing a stained histological image comprising a plurality of pixels;
   converting the stained histological image to an associated grayscale image;
   extracting a plurality of patches from the associated grayscale image, wherein each pixel of the plurality of pixels of the stained histological image is within at least one patch of the plurality of patches;
   for each patch of the plurality of patches:
      providing that patch to a deep learning model that has been trained to generate a synthetic version of a histology texture feature; and
      obtaining an associated patch from the deep learning model, wherein the associated patch indicates an associated value of the synthetic version of the histology texture feature for each pixel of that patch; and
   merging the associated patches for each patch of the plurality of patches to generate an associated feature map for the stained histological image, wherein the associated feature map indicates the associated value of the synthetic version of the histology texture feature for each pixel of the plurality of pixels.

2. The non-transitory computer-readable medium of claim 1, wherein the deep learning model is a convolutional neural network (CNN).

3. The non-transitory computer-readable medium of claim 2, wherein the deep learning model has a U-net architecture.

4. The non-transitory computer-readable medium of claim 1, wherein the histology texture feature is a Haralick feature.

5. The non-transitory computer-readable medium of claim 4, wherein the Haralick feature is one of a sum average, a sum of square: variance, a sum entropy, an inverse difference moment, a sum variance, a correlation, an angular second moment, an entropy, an information measure of correlation 1, an information measure of correlation 2, a contrast, a difference entropy, or a difference variance.

6. The non-transitory computer-readable medium of claim 1, wherein the operations further comprise generating one of a diagnosis or a prognosis for the stained histological image based at least in part on the associated feature map.

7. The non-transitory computer-readable medium of claim 6, wherein the stained histological image comprises a portion of a tumor, and wherein generating one of the diagnosis or the prognosis comprises determining a mutational status classification of the tumor.

8. The non-transitory computer-readable medium of claim 1, wherein each patch of the plurality of patches is 128×128 pixels, and wherein, for each patch of the plurality of patches, the associated patch is 128×128 pixels.

9. The non-transitory computer-readable medium of claim 1, wherein the operations further comprise:
   for each patch of the plurality of patches:
      providing that patch to an additional deep learning model that has been trained to generate a synthetic version of an additional histology texture feature; and
      obtaining an additional associated patch from the additional deep learning model, wherein the additional associated patch indicates an associated value of the synthetic version of the additional histology texture feature for each pixel of that patch; and
   merging the additional associated patches for each patch of the plurality of patches to generate an additional associated feature map for the stained histological image, wherein the associated feature map indicates the associated value of the synthetic version of the additional histology texture feature for each pixel of the plurality of pixels,
   wherein the additional histology texture feature is different from the histology texture feature.

10. The non-transitory computer-readable medium of claim 1, wherein the histology texture feature is one of a Haar feature or a Laws feature.

11. A non-transitory computer-readable medium storing computer-executable instructions that, when executed, cause a processor to perform operations, comprising:
   accessing a training set comprising a plurality of stained histological images, wherein each stained histological image is associated with an associated feature map that indicates associated ground truth values of a histology texture feature for pixels of that stained histological image;
   for each stained histological image of the training set:
      converting that stained histological image to an associated grayscale image;
      extracting a first plurality of patches from the associated grayscale image;
      for each patch of the first plurality of patches, extracting a corresponding patch from the associated feature map for that stained histological image; and
      providing the first plurality of patches and the corresponding patches to a deep learning model; and
   based on the first plurality of patches and the corresponding patches for each stained histological image of the training set, training the deep learning model to generate a synthetic version of the histology texture feature from an additional grayscale stained histological image.

12. The non-transitory computer-readable medium of claim 11, wherein the deep learning model is a convolutional neural network (CNN).

13. The non-transitory computer-readable medium of claim 12, wherein the deep learning model has a U-net architecture.

14. The non-transitory computer-readable medium of claim 11, wherein the histology texture feature is a Haralick feature.

15. The non-transitory computer-readable medium of claim 14, wherein the Haralick feature is one of a sum average, a sum of square: variance, a sum entropy, an inverse difference moment, a sum variance, a correlation, an angular second moment, an entropy, an information measure of correlation 1, an information measure of correlation 2, a contrast, a difference entropy, or a difference variance.

16. The non-transitory computer-readable medium of claim 11, wherein, for each stained histological image of the training set, each patch of the first plurality of patches is 128×128 pixels, and wherein, for each patch of the first plurality of patches, the corresponding patch is 128×128 pixels.

17. An apparatus, comprising:
   memory configured to store a stained histological image comprising a plurality of pixels; and
   one or more processors configured to:
      convert the stained histological image to an associated grayscale image;

extract a plurality of patches from the associated grayscale image, wherein each pixel of the plurality of pixels of the stained histological image is within at least one patch of the plurality of patches;

for each patch of the plurality of patches:

provide that patch to a deep learning model that has been trained to generate a synthetic version of a histology texture feature; and obtain an associated patch from the deep learning model, wherein the associated patch indicates an associated value of the synthetic version of the histology texture feature for each pixel of that patch; and merge the associated patches for each patch of the plurality of patches to generate an associated feature map for the stained histological image, wherein the associated feature map indicates the associated value of the synthetic version of the histology texture feature for each pixel of the plurality of pixels.

18. The apparatus of claim 17, wherein the deep learning model has a U-net architecture.

19. The apparatus of claim 17, wherein the histology texture feature is a Haralick feature.

20. The apparatus of claim 17, wherein the one or more processors are further configured to generate one of a diagnosis or a prognosis for the stained histological image based at least in part on the associated feature map.

* * * * *